(12) United States Patent
Hotta et al.

(10) Patent No.: US 7,554,751 B2
(45) Date of Patent: Jun. 30, 2009

(54) LENS AND OPTICAL PICKUP DEVICE

(75) Inventors: Tohru Hotta, Ora-gun (JP); Ryouichi Kawasaki, Isesaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 208 days.

(21) Appl. No.: 11/481,598

(22) Filed: Jul. 6, 2006

(65) Prior Publication Data

US 2007/0008630 A1    Jan. 11, 2007

(30) Foreign Application Priority Data

Jul. 8, 2005    (JP) .............................. 2005-199761

(51) Int. Cl.
*G02B 13/00*    (2006.01)
(52) U.S. Cl. ..................................... 359/724
(58) Field of Classification Search ............... 359/724, 359/565, 572
See application file for complete search history.

(56) References Cited

U.S. PATENT DOCUMENTS

| | | | | |
|---|---|---|---|---|
| 5,013,133 A | * | 5/1991 | Buralli et al. | 359/558 |
| 5,151,823 A | * | 9/1992 | Chen | 359/565 |
| 5,589,982 A | * | 12/1996 | Faklis et al. | 359/565 |
| 5,796,520 A | * | 8/1998 | Maruyama | 359/565 |
| 2003/0133478 A1 | * | 7/2003 | Sidorin | 372/20 |

FOREIGN PATENT DOCUMENTS

JP    2003-294915    10/2003

* cited by examiner

*Primary Examiner*—Joseph Martinez
*Assistant Examiner*—James R Greece
(74) *Attorney, Agent, or Firm*—Pillsbury Winthrop Shaw Pittman LLP (57) ABSTRACT

A lens is provided with a reflective annular zone face that is approximately perpendicular to the lens optical axis, and tilt of the reflective annular zone face is set to be equivalent to coma aberration resulting from the lens.

1 Claim, 7 Drawing Sheets

LENS AND OPTICAL PICKUP DEVICE

PRIORITY INFORMATION

This application claims priority to Japanese Patent Application No. 2005-199761 which is incorporated herein by reference in its entirety.

BACKGROUND OF THE INVENTION

1. Field of the Invention

The present invention relates to a lens for use in reproducing data recorded in a medium, such as, for example, an "HD DVD" (High Definition DVD) disk, or in recording data in a medium, and to an optical pickup device equipped with such lens.

2. Description of the Related Art

Figure 5:
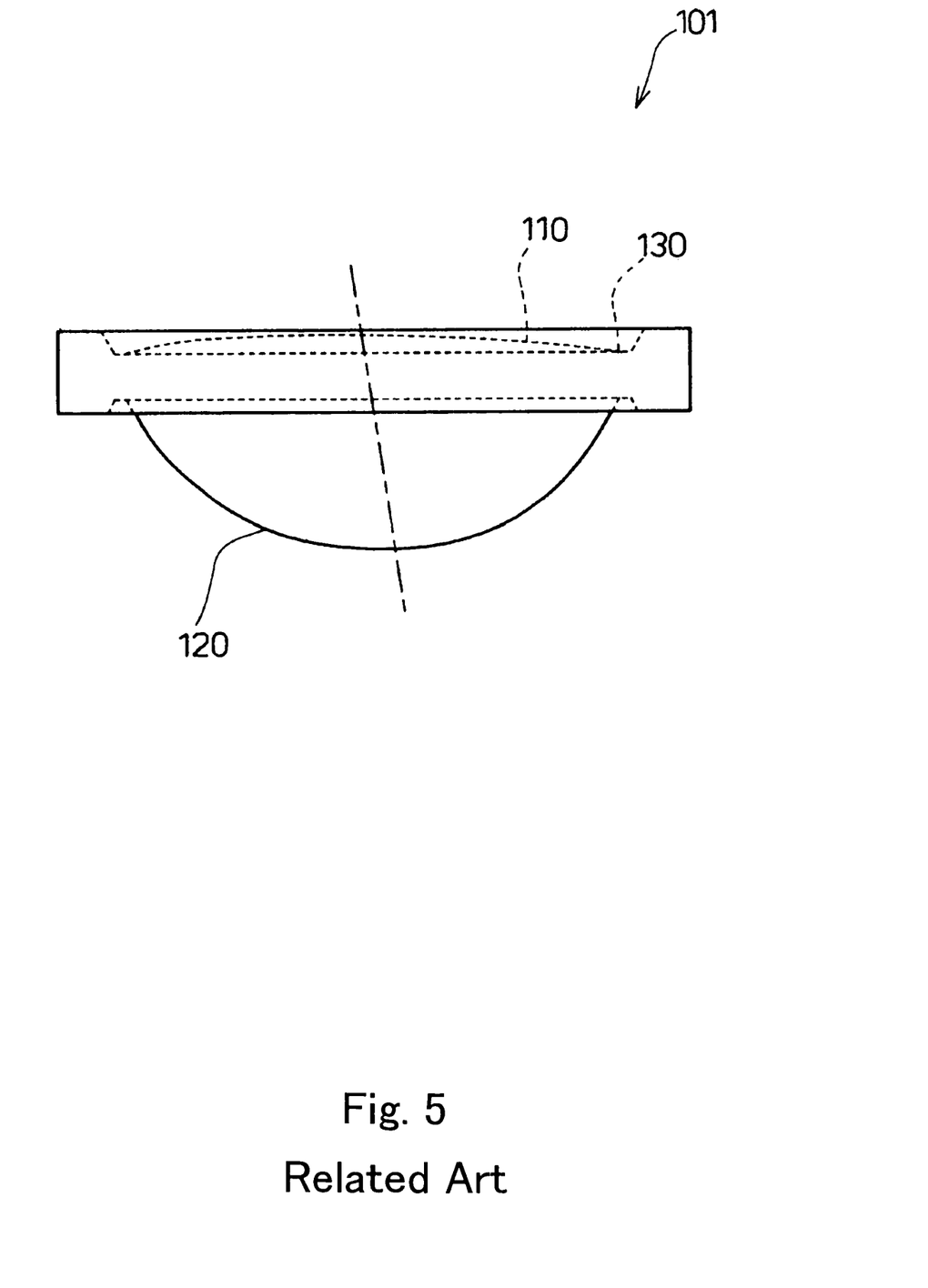
FIG. 5 is an illustrative drawing showing an embodiment of a conventional lens.
Figure 6:
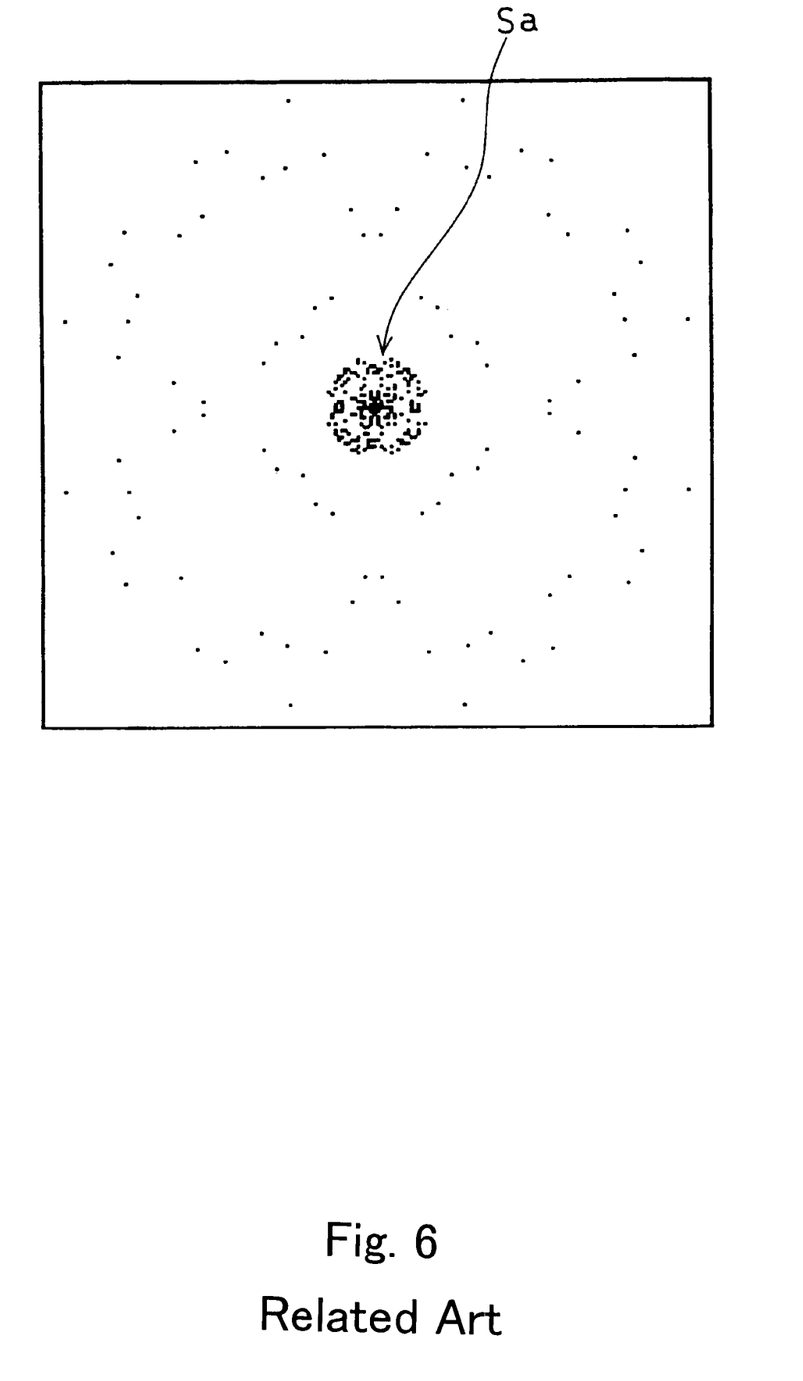
FIG. 6 is an illustrative drawing showing a normal spot.
Figure 7:
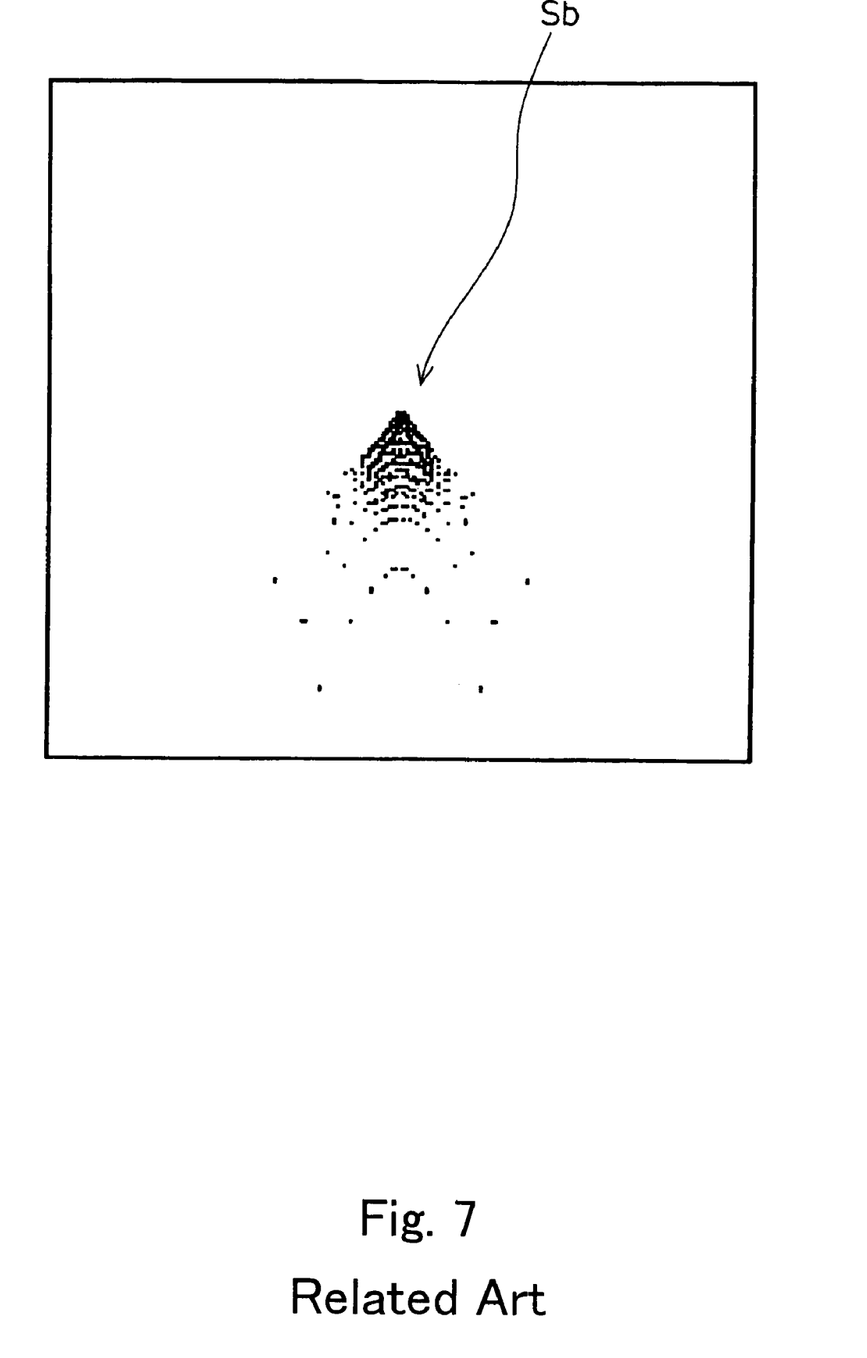
FIG. 7 is an illustrative drawing showing a spot having generated coma aberration.

FIG. 5 is an illustrative drawing showing a figure of a conventional lens, FIG. 6 is an illustrative drawing showing a normal spot, and FIG. 7 is an illustrative drawing showing a spot with coma aberration.

Previously, tilt of an OBL (OBL=Objective Lens) holder (not shown in any of the figures) has been adjusted so that the posture of an objective lens 101 is made parallel to an axis reference of an optical pickup device (not shown) while examining a reflective annular zone A face 130 on an objective lens surface with an auto-collimator (not shown). An auto-collimator here refers to a measuring gauge for measuring a property such as, for example, straightness, perpendicularity, parallelism, or flatness while irradiating light to a target surface, such as a level block or a guide surface.

As a conventional one, for example, there is an objective lens for an optical head device in which an ingenious plan is made for a lens shape in order to simply carry out operation of adjusting a tilt angle when mounting an objective lens for an optical head device to an objective lens-driving mechanism, or determining the aberration of OBL lens.

When laser light is focused onto an optical recording disc using an optical head device equipped with a high quality OBL, the shape of a spot Sa (FIG. 6) focused and formed on an optical recording disc is approximately a regular circle.

In the above-described conventional lens 101 (FIG. 5), however, because the tilt of reflective annular zone A face 130 is not necessarily equivalent to the coma aberration resulting from OBL 101, adjustment of the tilt of OBL 101 using the reflective annular zone A face 130 results in generation of coma aberration for an imaged spot Sb as shown in FIG. 7. In FIG. 5, to facilitate understanding of the OBL 101 in a defective state, a defective state of curved lens faces 110, 120 is shown in an exaggerated form.

SUMMARY OF THE INVENTION

The lens according to the present invention is characterized in the provision of a reflective annular zone face that is approximately perpendicular to the lens optical axis, wherein the tilt of reflective annular zone face is arranged to be equivalent to the coma aberration resulting from the overall lens.

BRIEF DESCRIPTION OF THE DRAWINGS

Preferred embodiments of the present invention will be described in detail based on the following figures, wherein.

DESCRIPTION OF THE EMBODIMENT

A preferred embodiment of the lens and optical pickup device according to the present invention will be described in detail below with reference to the drawings.

Figure 1:
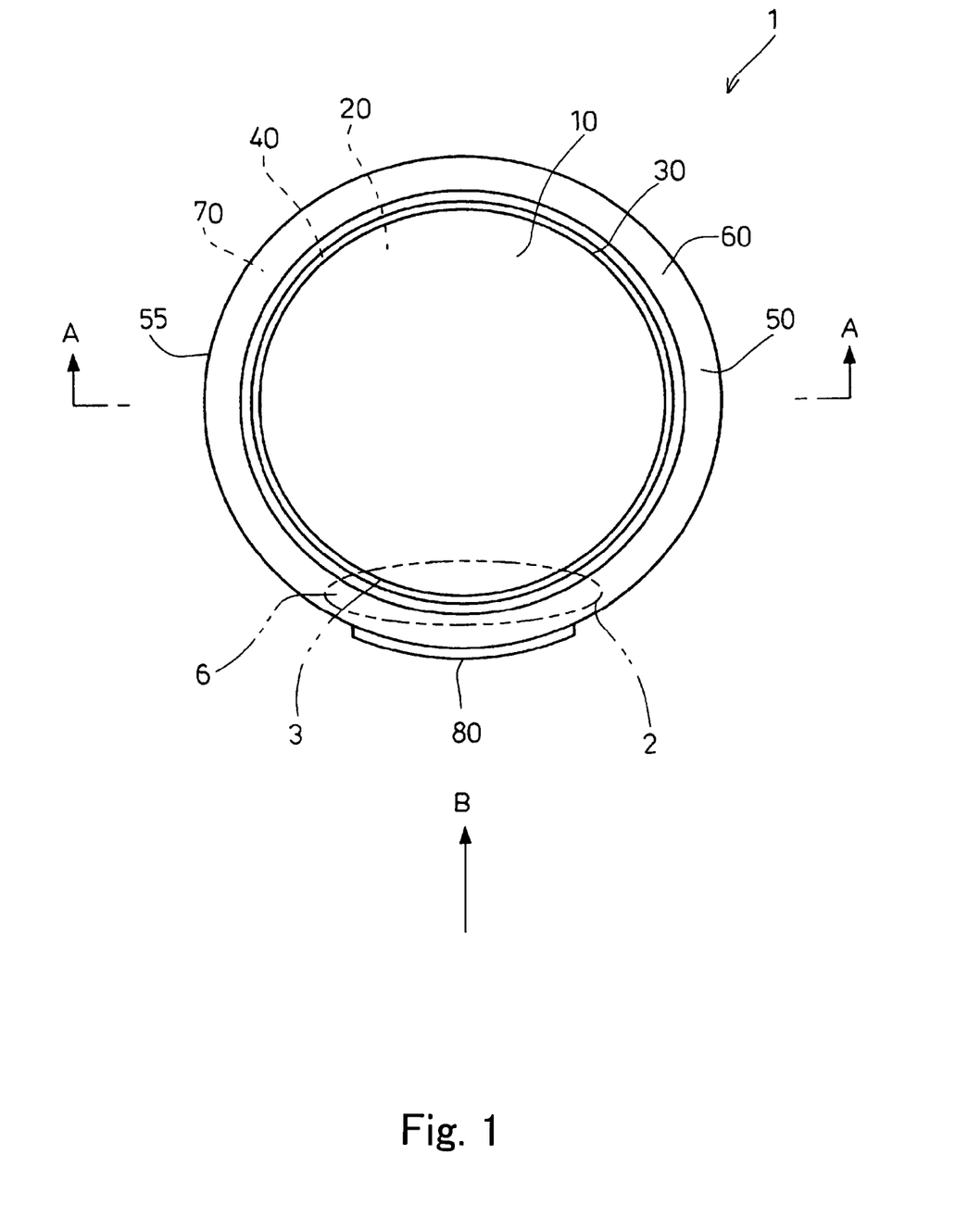
FIG. 1 is a plan view showing an embodiment of the lens according to the present invention.
Figure 2:
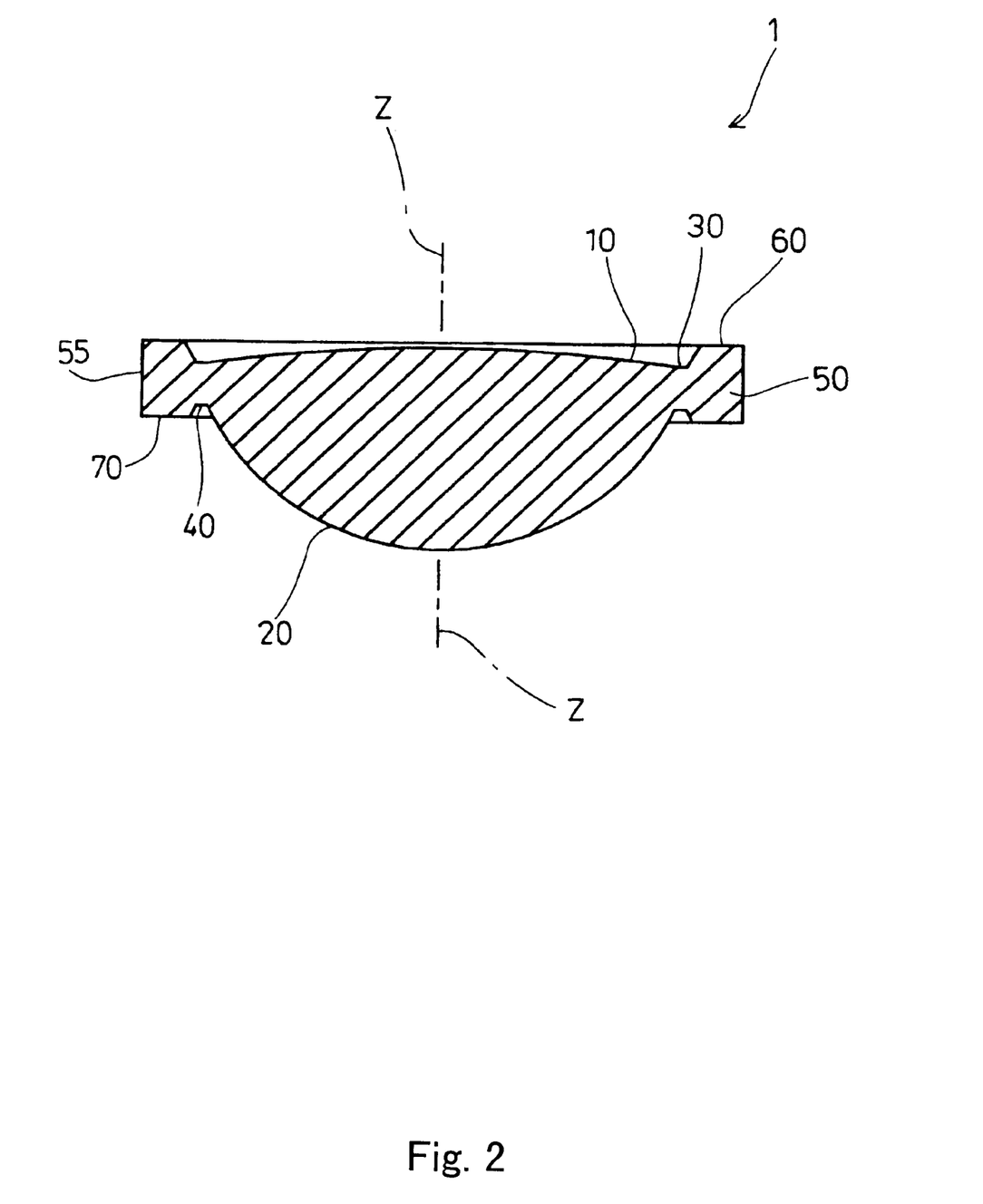
FIG. 2 is an A-A cross-sectional view in FIG. 1.
Figure 3:
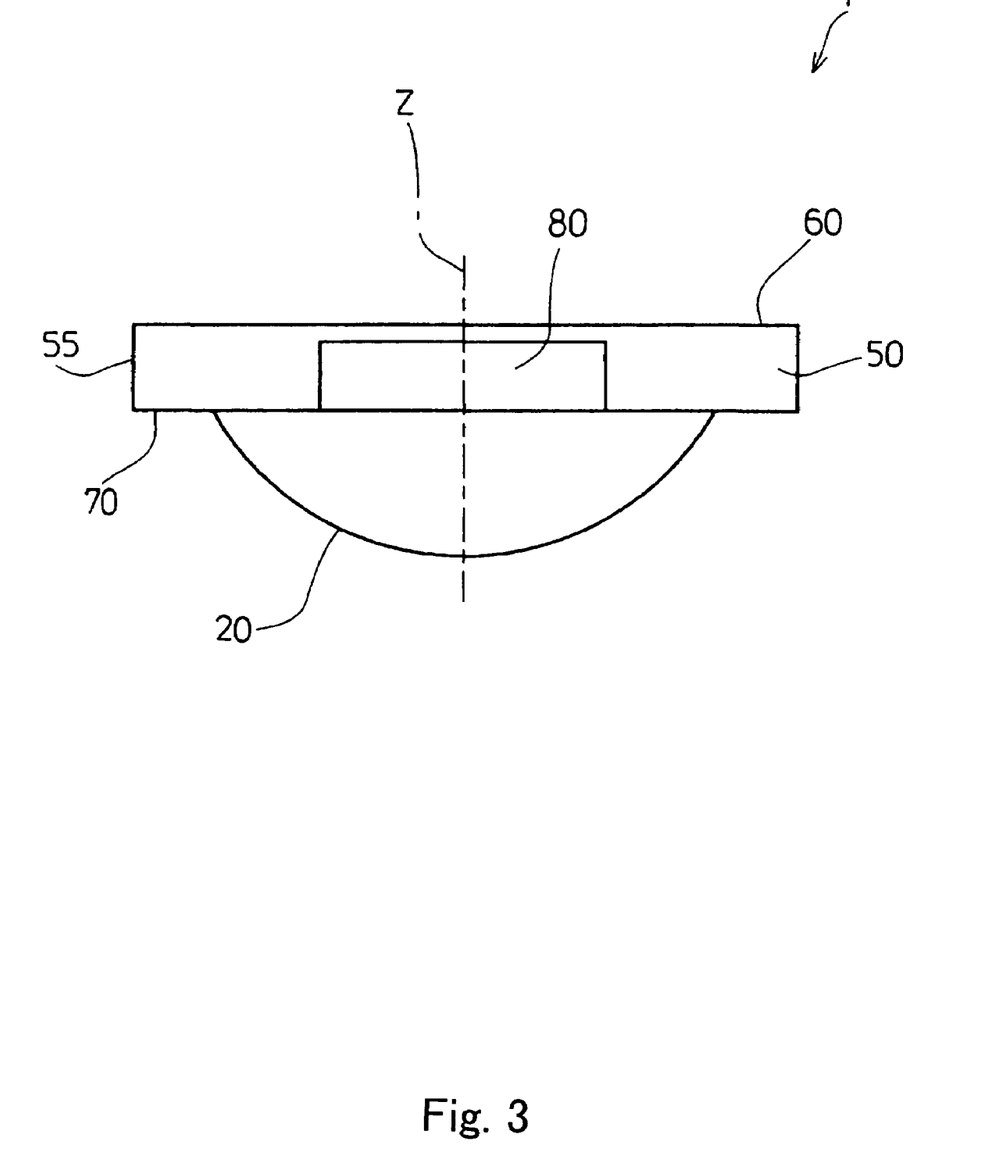
FIG. 3 is a side view showing a state of the lens viewed from B side in FIG. 1.
Figure 4:
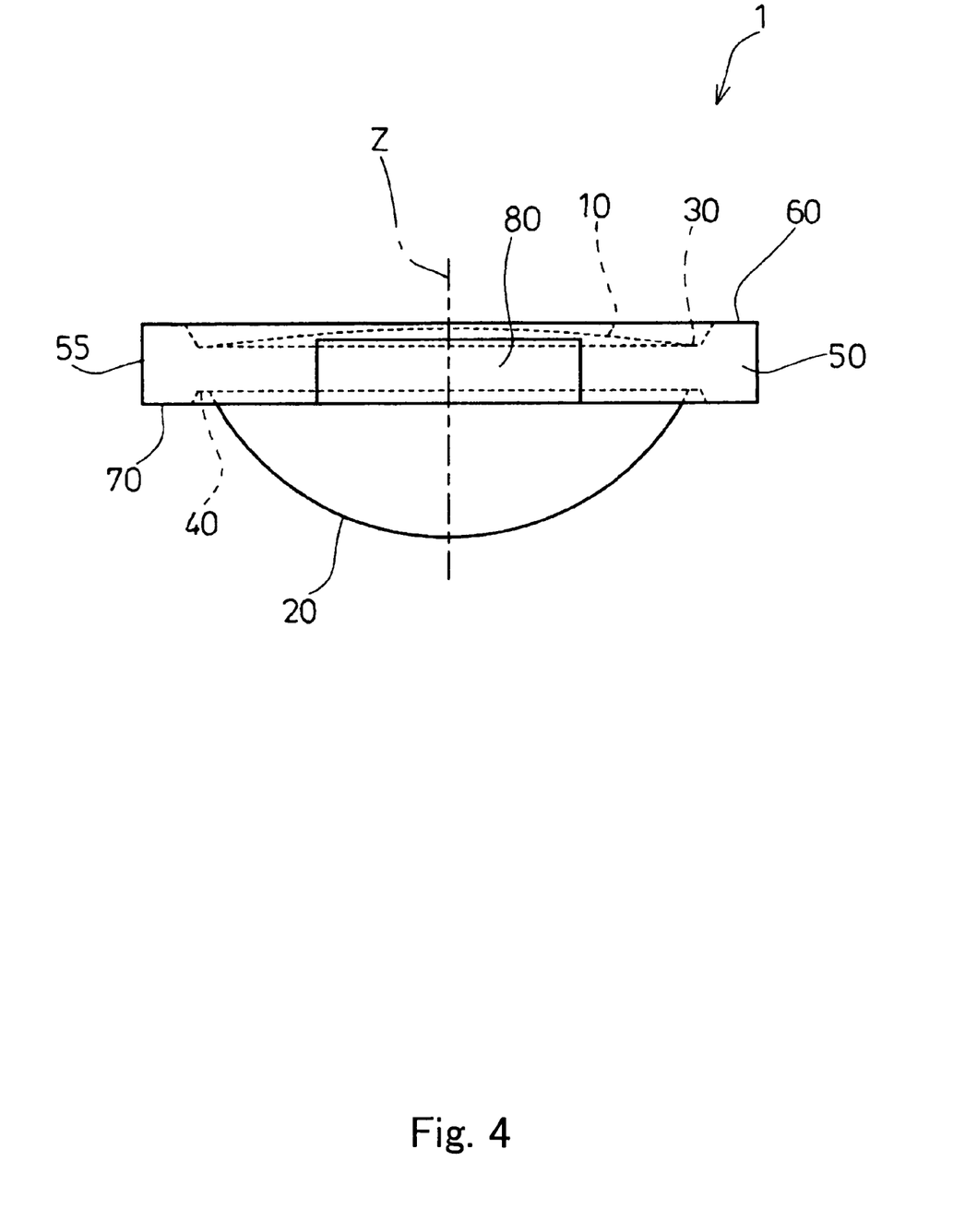
FIG. 4 is an illustrative drawing showing the lens.

FIG. 1 is a plan view showing an embodiment of the lens according to the present invention, FIG. 2 is an A-A cross-sectional view in FIG. 1, FIG. 3 is a side view showing a state of the lens viewed from the B side in FIG. 1, and FIG. 4 is an illustrative drawing showing the lens.

The optical axis Z (FIGS. 2-4) of lens 1 (FIGS. 1-4) is an axis along the direction extended perpendicular to the paper surface of FIG. 1 from the center of curved lens face 10 shown in FIG. 1. Here, the side on which a first curved lens face 10 is arranged is referred to as the upside of the lens 1, and the side on which a second curved lens face 20 is arranged is referred to as the downside of the lens 1. The terms "upside" and "downside" in this specification are defined for the purpose of describing the lens 1.

As shown in FIG. 1, FIG. 2 and FIG. 4, the lens 1 is provided with curved lens faces 10, 20 i bent through which the optical axis Z of lens face passes, approximately planar reflective annular zone faces 30/40/60/70 that are approximately perpendicular to the lens optical axis Z, and a lens-mounting portion 50 in an approximately annular shape disposed outside the curved lens faces 10, 20 bent. The tilt of approximately planar reflective annular zone faces 30/40/60/70 is determined such that it is equivalent to the coma aberration resulting from the complete lens.

A lens 1 in which the tilt of approximately planar reflective annular zone faces 30/40/60/70 has been determined to be equivalent to the coma aberration resulting from the complete lens will next be described. Such a lens 1 can be formed as a lens comprising, for example, a first curved lens face 10, a second curved lens face 20, and reflective annular zone faces 30, 40 arranged to respective peripheries of curved lens faces 10, 20 having been formed with a high accuracy according to design or specification. Alternatively, the lens 1 can be formed as a lens comprising, for example, the first curved lens face 10, the second curved lens face 20, and reflective annular zone faces 60/70 of lens-mounting portion 50 formed with a high accuracy according to design/specification.

The lens 1, which has been formed so that the tilt of reflective annular zone faces 30/40/60/70 formed in an approximately planar state is equivalent to coma aberration resulting from the lens in its entirety, is formed as the lens 1 with a high accuracy. As described above, aberration indicates that light passing through, for example, the lens 1 can not be properly collected to one point, thereby forming an incomplete image. Coma aberration indicates that light obliquely entering from an objective point apart from an optical axis Z produces an image through lens 1 does not form a circular dot, but broadens to form, for example, a comet-like shape (FIG. 7). When the tilt of approximately planar reflective annular zone 30/40/60/70 (FIG. 1, FIG. 2, FIG. 4) is formed so as to be equivalent to the coma aberration resulting from the overall lens, a high quality lens 1 which inhibits generation of coma aberration can be provided to lens manufacturers, optical apparatus manufacturers, and the like.

The tilt of the approximately planar reflective annular zone faces 30/40/60/70 arranged to the lens 1 is measured by, for example, a lens-discriminating means (not shown) provided with an auto-collimator (not shown). At that time, the direction of coma aberration resulting from the overall lens is measured (FIG. 7).

By measuring lens properties in this manner, coma aberration can be easily measured. By measuring the tilt of reflective annular zone faces 30/40/60/70 (FIG. 1, FIG. 2, FIG. 4) with a lens-discriminating means provided with an auto-collimator, coma aberration resulting from the lens can be easily determined. Accordingly, the lens 1 whose coma aberration has been measured can be easily provided to lens manufacturers, optical apparatus manufacturers, and the like.

Only the lens 1, which has coma aberration having been set in a range of approximately 0-0.016 λrms and the numerical aperture of a lens 1 to, for example, approximately 0.45-0.95, preferably approximately 0.45-0.85, more preferably approximately 0.45-0.67, can be used for a optical pickup device.

TABLE 1

| numerical aperture (NA) | coma aberration (λrms) |
|---|---|
| 0.67 | 0.015 |
| 0.65 | 0.014 |
| 0.60 | 0.012 |

Numerical aperture refers to the product of the sine of the angle that is formed when an effective radius of an objective lens (radius of incident pupil) is viewed from an object point in an optical apparatus and refraction index of medium on incident side. Numerical aperture is abbreviated as "NA" and is used when representing performance of an objective lens.

For example, the NA of a lens used in conjunction with the CD (Compact Disc) format may be approximately 0.45-0.51. The NA of a lens used in conjunction with the DVD (Digital Versatile Disc) format may be, for example, approximately 0.6-0.67, and preferably approximately 0.6-0.65. The NA of a lens corresponding to a disc of Blu-ray Disc series may be approximately 0.85. "Blu-ray" refers to a bluish-violet laser capable of, for example, high density recording to a disc. Moreover, a lens having a NA of approximately 0.95 for an optical pickup device is also known.

For example, when a lens 1 having a NA of approximately 0.6 is arranged to an optical pickup device (not shown) capable of reading and writing information and data for a medium such as a CD or DVD format disc, the lens 1 is made to substantially function as a lens having a NA of approximately 0.45-0.65 by arranging a broad spectrum quarter-wavelength plate with limited aperture (not shown) in the optical path of optical pickup device.

By selecting only the lens 1 whose coma aberration lies in a range of approximately 0-0.016 λrms as the lens 1 to be used for an optical pickup device, a lens 1 having whose coma aberration has been accurately measured (FIGS. 1-4) can be provided to lens manufacturers, optical apparatus manufacturers, and the like. When a lens 1 having a coma aberration set in a range of 0-0.016 λrms and a NA, for example, ranging approximately 0.45-0.95, preferably approximately 0.45-0.85, more preferably approximately 0.45-0.67 is produced, laser light focused by the lens 1 forms an approximate dot shape (FIG. 6). Accordingly, when laser light passing through the lens 1 is focused, fanning out of the laser light to form, for example, a comet-like footprint (FIG. 7) instead of a dot can be avoided and the laser light can be focused in an approximately dot state with a high accuracy (FIG. 6).

For example, when a lens formed to have a coma aberration of approximately 0 λrms (FIGS. 1-4) is used, laser light passing through the lens 1 is focused in a nearly ideal dot state, as shown, for example, in FIG. 6. In addition, for example, when a lens 1 formed to have a coma aberration of approximately 0.005 λrms (FIGS. 1-4) is used, laser light passing through the lens 1 focuses with an extremely high accuracy. Also, for example, when a lens 1 formed so as to have a coma aberration of approximately 0.01 λrms is used, laser light passing through the lens 1 focuses with a very high accuracy. Also, when a lens 1 formed to have a coma aberration of approximately 0.015 λrms is used, laser light passing through the lens 1 focuses with a high accuracy. Also, when a lens 1 formed to have a coma aberration of approximately 0.016 λrms is used, laser light passing through the lens 1 focuses with a high accuracy.

However, when a lens (1) having a coma aberration of above approximately 0.016 λrms is used, and laser light passes through the lens (1) is focused, aberration for the focal point of laser light is generated (FIG. 7).

When a lens 1 formed to have a coma aberration in the range of 0-0.016 λrms (FIGS. 1-4), more preferably a lens 1 formed to have a coma aberration ranging from 0-0.015 λrms, is used, laser light passing through the lens 1 is focused form a highly accurate focal point. When molding accuracy upon forming the lens 1 on the basis of an injection molding method is taken into consideration, for example, molding of a lens 1 with a coma aberration in a range from 0.005-0.016 λrms is realistically possible. Moreover, when molding accuracy upon forming the lens 1 on the basis of an injection molding method and yield upon producing the lens 1 are taken into consideration, lenses 1 with a coma aberration in a range from 0.01-0.016 λrms can be molded with a high productivity.

As shown in FIG. 1, FIG. 2, and FIG. 4, the lens 1 is formed so as to have a plurality of curved lens faces 10, 20 in order to refract light. Around the curved lens faces 10, 20 are disposed first reflective annular zone faces 30, 40, with approximately planar and annular shapes.

Measurement of coma aberration of the lens 1 can be easily accomplished using the first reflective annular zone faces 30 or 40 having an approximately planar or approximately annular shape arranged to the lens 1 when measuring coma aberration of the lens 1. Measurement of coma aberration as the lens is performed using the first reflective annular zones face 30 or 40 having approximately planar and annular shapes located around the curved lens faces 10, 20 refracts light.

As shown in FIGS. 1-4, the lens 1 is formed so as to be provided with a lens-mounting portion 50 having an approximately annular shape, which is disposed to the outside of the curved lens faces 10, 20 and the first reflective annular zone faces 30, 40, and is mounted to a counterpart lens-holding section such as a lens holder (not shown). The approximately annular lens-mounting portion 50 is disposed with approximately planar and approximately annular second reflective annular zone faces 60, 70.

When the approximately annular lens-mounting portion 50 is disposed with the approximately planar and approximately annular second reflective annular zone faces 60, 70, measurement of coma aberration of the lens 1 can be easily performed. The coma aberration of the lens can be measured using the approximately planar and annular second reflective annular zone faces 60 or 70 of the lens-mounting portion 50 that is to be mounted to the counterpart lens-holding section as a lens holder.

In order to determine quality of a lens, a discrimination means for discriminating a lens provided with an auto-collimator may be used. Light emitted from a means for discriminating a lens provided with an auto-collimator is aligned with the lens optical axis Z, the light aligned with the lens optical axis Z is irradiated to reflective annular zone faces 30/40/60/70 of the lens 1, and the light reflected from these zone faces is measured with the means for discriminating a lens provided with an auto-collimator to thereby determine the quality of lens.

A flatness degraded portion 3 (FIG. 1) is formed on the first reflective annular zone face 30 on the upside of the lens 1 as a result of degradation of flatness of the first reflective annular zone face 30 formed in an approximately planar shape. This flatness degraded portion 3 is formed on the first reflective annular zone face 30 on the upside formed in an approximately planar and approximately annular shape in the antireflection-processed region 2 shown in an approximately elliptical shape. In addition, a flatness degraded portion 6 (FIG. 1) is formed on the second reflective annular zone face 60 on the upside of the lens 1 due to degradation of flatness of the second reflective annular zone face 60 on the upside formed in an approximately planar shape. This flatness degraded portion 6 is formed on the second reflective annular zone face 60 on the upside formed in an approximately planar and approximately annular shape in the antireflection-processed region 2 shown in an approximately elliptical shape. The flatness degraded portions 3, 6 are formed in the antireflection-processed region 2 having a low light reflectance in the lens 1.

Formation of the flatness degraded portions 3, 6 in the antireflection-processed region 2 of the lens 1 enables accurate determination of lens quality by a lens discrimination means using, for example, a lens discrimination means provided with an auto-collimator. When flatness degraded portions 3, 6 having a low light reflectance have been formed to the lens 1 due to degradation of flatness of the reflective annular zone faces 30, 60 on the upside of the lens 1 to form the antireflection-processed region 2 including respective flatness degraded portions 3, 6, light emitted from the lens discrimination means provided with an auto-collimator is irradiated to the flatness degraded portion 3 or 6 in the antireflection-processed region 2 of the lens 1 is hardly reflected. Accordingly, situations such as light reflected from the flatness degraded portion 3 or 6 of the antireflection-processed region 2 of lens 1 entering, for example, a lens discrimination means provided with an auto-collimator to cause the lens discrimination means provided with an auto-collimator determine to determine the usable lens 1 as a defective product that generates coma aberration can be avoided. As a result, discrimination of coma aberration of the lens 1 during the lens production process can be reliably performed, and yield of the lenses 1 in the lens production process can be enhanced.

The antireflection-processed region 2 is provided to the lens 1 for the purpose of inhibiting generation of coma aberration in a lens discrimination means when lens quality is determined by a lens discrimination means (not shown) provided with a CCD imaging device (not shown), an auto-collimator (not shown), or the like.

Determination of lens quality is reliably performed by using a lens discrimination means provided with a CCD-based imaging device, an auto-collimator or the like. Here, a CCD (Charge Coupled Device) refers to a semiconductor device that converts optical information to electric information. Also, as described above, an auto-collimator refers to a measuring gauge for measuring, for example, straightness, perpendicularity, parallelism, flatness or the like by irradiating light onto an object surface, such as a level block or guide face.

When the lens 1 is injection-molded, any distortion in molding generated near an injection gate trail portion 80 degrades the optical flatness near the injection gate trail portion 80. The antireflection-processed region 2 is located near the injection gate trail portion 80 of the lens 1.

The flatness degraded portions 3, 6 in the antireflection-processed region 2 of the lens 1 are formed as roughened surface portions 3, 6 for inhibiting reflection of light. On the surface of roughened surface portions 3, 6, for example, wrinkle-like concavity and convexity are arranged. Alternatively, the surface of roughened surface portions 3, 6, for example, may be textured similar to the skin of a pear.

The flatness degraded portions 3, 6 formed in the antireflection-processed region 2 of the lens 1 as the roughened surface portions 3, 6 for inhibiting reflection of light enable reliable determination of lens quality by a lens discrimination means when lens quality is measured using, for example, a lens discrimination means provided with an auto-collimator. Since the flatness degraded portions 3, 6 in the antireflection-processed region 2 of the lens 1 is formed as the roughened surface portions 3, 6 that inhibit reflection of light, a situation in which, when lens quality is determined, light reflected from the flatness degraded portion 3 or 6 in the antireflection-processed region 2 of the lens 1 enters a lens discrimination means provided with an auto-collimator and causes the lens discrimination means provided with an auto-collimator to determine a usable lens 1 as a defective product that generates coma aberration can be prevented. Accordingly, the lens discrimination means provided with an auto-collimator accurately and reliably determines the coma aberration.

The lens 1 is subjected to antireflection coating processing without forming an antireflection film to the antireflection-processed region 2 of the lens 1.

Optical reflectance R of the reflective annular zone faces 30, 60 in the portion where no antireflection film has been formed is formed so as to be, for example, about 4%. Further, optical reflectance at the flatness degraded portions 3, 6 in the antireflection-processed region 2 of the lens 1 is formed so as to be about 0-10% (for example) of optical reflectance R (for example, about 4%) of the reflective annular zone faces 30, 60 in the portion where no antireflection film has been formed. Specifically, optical reflectance at the flatness degraded portions 3, 6 in the antireflection-processed region 2 of the lens 1 is formed so as to be, for example, 0-0.1%.

When optical reflectance at the flatness degraded portions 3, 6 in the antireflection-processed region 2 of the lens 1 is 0.1%, determination of lens quality by a lens discrimination means can be reliably determined using, for example, a lens discrimination means provided with an auto-collimator. Because the optical reflectance at the flatness degraded portions 3, 6 in the antireflection-processed region 2 of the lens 1 is only 0-0.1%, a situation such as, when lens quality is determined, a significant amount of light being reflected from the flatness degraded portion 3 or 6 in the antireflection-processed region 2 of the lens 1 and entering a lens discrimination means provided with an auto-collimator to lead to cause the lens discrimination means provided with an auto-collimator to determine the usable lens 1 as a defective product that generates coma aberration can be prevented.

When the optical reflectance at the flatness degraded portions 3, 6 in the antireflection-processed region 2 of the lens 1 is 0%, no optical reflection exists. Accordingly, light will not be reflected from the flatness degraded portion 3 or 6 in the antireflection-processed region 2 of the lens 1 into the lens discrimination means provided with an auto-collimator. Further, because only a small amount of light is reflected when the optical reflectance at the flatness degraded portions 3, 6 in the antireflection-processed region 2 of the lens 1 is, for example, about 0.05%, a significant amount of light being reflected from the flatness degraded portion 3 or 6 in the antireflection-processed region 2 of the lens 1 into a lens discrimination means provided with an auto-collimator can be prevented. Furthermore, because only a small amount of light is reflected when the optical reflectance at the flatness degraded portions 3, 6 in the antireflection-processed region 2 of the lens 1 is 0.1%, a situation in which a significant amount of light is reflected from the flatness degraded portion 3 or 6 in the antireflection-processed region 2 of the lens 1 into a lens discrimination means provided with an auto-collimator can be avoided.

When the optical reflectance at the flatness degraded portions 3, 6 in the antireflection-processed region 2 of the lens 1 is 0.1% or more, it is possible that a significant amount of light reflected from the flatness degraded portion 3 or 6 in the antireflection-processed region 2 of the lens 1 will enter a lens discrimination means provided with an auto-collimator. In such a case, it is possible that, as the result of an effect of light reflected from the flatness degraded portion 3 or 6 in the antireflection-processed region 2 of the lens 1, a lens discrimination means provided with an auto-collimator may determine the usable lens 1 as a defective product that generates coma aberration. However, determination error by the lens discrimination means can be prevented by setting the optical reflectance at the flatness degraded portions 3, 6 in the antireflection-processed region 2 of lens 1 to a low reflectance such as 0-0.1%. Accordingly, coma aberration determination by the lens discrimination means can be performed accurately and reliably.

The antireflection-processed region 2 of the lens 1 is disposed near the injection gate trail portion 80 that is formed when the lens 1 is molded by an injection molding method. The injection gate trail portion 80 of the lens 1 remains in such state that, for example, it protrudes in a direction from a periphery portion 55 of approximately annular lens-mounting portion 50 to the outside of approximately annular lens-mounting portion 50.

By arranging the antireflection-processed region 2 near the injection gate trail portion 80 of the lens 1, generation of coma aberration during measurement of a lens is inhibited. When the lens 1 is formed by an injection molding method, for example, a depression on the surface of the molded product may be generated near the injection gate trail portion 80. Here, an injection molding method refers to a method for forming a molded product, for example, by pouring a heated material into a hollow mold and then cooling and solidifying it.

When the antireflection-processed region 2 including the flatness degraded portions 3, 6 having a low light reflectance is arranged near the injection gate trail portion 80 of the lens 1 and lens quality is determined using a lens discrimination means provided with an auto-collimator, a situation in which light reflected from the depressed portion of the surface causes the lens discrimination means provided with an auto-collimator to erroneously determines a usable lens 1 to be a defective product that generates coma aberration can be prevented. Accordingly, determination of coma aberration of a lens 1 by a lens discrimination means provided with an auto-collimator can be performed reliably.

The lens 1 shown in FIGS. 1-4 is used as an objective lens 1 to face a medium (not shown) in order to record various types of data. The medium is one on which various types of data can be read or written. As described above, an objective lens is abbreviated as "OBL". A first curved lens face 10 of OBL 1 is intended to be a surface that faces to a medium for carrying out reading and writing of data. As shown in FIGS. 2 and 4, when the first curved lens face 10 of OBL 1 and the second curved lens face 20 of OBL 1 are compared, the shape of the first curved lens face 10 is more moderately curved than the second curved lens face 20.

As example media, optical discs or the like can be considered. Examples optical discs include read only optical discs such as "CD-ROM" and "DVD-ROM" format discs, and recordable optical discs such as those of the "CD-R", "DVD-R", and "DVD+R" format; and data writing/erasing or data rewritable optical discs such as "CD-RW", "DVD-RW", "DVD+RW", "DVD-RAM", "HD DVD", and "Blu-ray" Format discs.

Certain optical discs are also configured to have signal surfaces on which data can be written, erased, or rewritten on both sides of the disc. In addition, some optical discs (are arranged with, for example, a two-layered signal face for data writing/erasing or data rewriting. Still further, some optical discs, such as those for use in the "HD DVD" format, are arranged with, for example, a three-layered signal face for data writing/erasing or data rewriting. Still further, optical discs conforming to the "Blu-ray" format are arranged with a four-layered signal face for data writing/erasing or data rewriting.

The suffix "ROM" as used in "CD-ROM" or "DVD-ROM" is an acronym for "Read Only Memory." "CD-ROM" or "DVD-ROM" discs are exclusively used for reading out data. The suffix "R" as used "CD-R", "DVD-R", or "DVD+R", however, stands for "Recordable", indicating that data can be written to "CD-R", "DVD-R", or "DVD+R" discs. The suffix "RW" as used in "CD-RW", "DVD-RW", or "DVD+RW" in turn stands for "Rewritable" and indicates that it is possible to rewrite data onto "CD-RW", "DVD-RW", or "DVD+RW" discs, that is the same disc can be used multiple times. "DVD-RAM" is an acronym of "Digital Versatile Disc Random Access Memory". with a "DVD-RAM", reading, writing, erasing, and overwriting of data are all possible.

"HD DVD" stands for "High Definition DVD". The "HD DVD" format is compatible with conventional DVD discs, but HD-DVD discs have a larger memory capacity than conventional DVD discs. While conventional CDs employ a red or near-infrared laser, and conventional DVDs also employ a red laser, data is read from and recorded onto an optical disc 200 of the "HD DVD" type suing a bluish-violet laser. The term "Blu-ray" is similarly a trade name associated with a system employing a bluish-violet laser in order to realize higher density recording than possible with the red lasers heretofore used in the related art for reading and writing of signals.

Through use of the present invention, an OBL 1 (FIGS. 1-4) that can be used in connection with various types of optical discs and maintain a high accuracy as the result of reliable coma aberration detection can be provided to lens manufacturers, optical apparatus manufacturers and the like. For an OBL 1 positioned to face an optical disc, a high accuracy is required. The present invention enables provision of OBLs 1 fulfilling such requirements to the market.

When the OBL 1 is formed so that the tilt of at least one of the approximately planar reflective annular zone faces 30/40/60/70, one approximately perpendicular to the lens optical axis Z, is made to be equivalent to the overall coma aberration of a lens, accurate and reliable lens quality determination can be performed using, for example, a lens discrimination means provided with an auto-collimator. Accordingly, a highly accurate OBL 1 having been subjected to coma aberration detection can be provided to lens manufacturers, optical apparatus manufacturers, and the like.

The antireflection-processed region 2 of the OBL 1 is arranged in the OBL 1 on the side facing a medium in order to perform reading and writing of data. In other words, the antireflection-processed region 2 of the OBL 1 is arranged in the OBL 1 on the side of upper first curved lens face 10 facing a medium from which data is read and written. In this connection, according to the design and specification of the lens 1, a lens can be also used that is arranged with the antireflection-processed region 2 including a flatness degraded portions (3, 6) with a low optical reflectance, for example, on the side of second curved lens face (20) lying on the downside of an OBL (1).

A specific method for determining the quality of the lens 1 through which laser light can pass will be described.

By representing the numerical aperture of the lens 1 as NA, coma aberration as CA (λrms), and a coefficient C as a value ranging from 0.0334-0.0336, lens quality can be determined using the following Formula (1):

$$CA \leq C \times (NA)^2 \quad (1)$$

As represented by the Formula (1), coma aberration CA is proportional to the square of the numerical aperture NA of the lens. By determining the coefficient C to be, for example, 0.0334 or 0.0335, as shown in Table 1, relationship between the numerical aperture NA of the lens and coma aberration CA can be derived.

By using the Formula (1), accurate and reliable detection and measurement of coma aberration of the lens 1 can be carried out. Remaining coma aberration is numerically represented based on the Formula (1), and lens quality is determined based on the numerically represented coma aberration, thereby avoiding results such as an indefinite lens quality determination. Accordingly, a lens 1 whose coma aberration was detected with reliable accuracy can be provided to lens manufacturers, optical apparatus manufacturers, and the like.

As describe above, detection and measurement of coma aberration in the lens 1 is accurately and reliably performed using the above Formula (1). As a result of using the Formula (1), coma aberration CA of the lens 1 is represented as a numerical value. On the basis of a value of coma aberration CA calculated based on the formula (1), coma aberration detection of the lens 1 is carried out accurately and reliably.

The above-described lens 1 is mounted to an optical pickup device (not shown). The above-described OBL 1 is mounted to a lens holder (not shown) of an optical pickup device. By arranging the OBL 1 mounted to a lens holder to a housing (not shown) capable of receiving various elements, such as the OBL 1 having a housing, an optical pickup device provided with the OBL 1 (not shown) can be constructed.

As a result, a highly precise optical pickup device is constructed. Because lens 1 arranged to the optical pickup device has been subjected to coma aberration detection, defective operation as a result of generation of coma aberration at the focus of lens 1 during operation of the optical pickup device can be prevented. Accordingly, users such as disc apparatus manufacturers, optical apparatus manufacturers, and the like can be provided with optical pickup devices which inhibit generation of coma aberration of the lens 1 when laser light focuses onto such medium as an optical disc when reading and writing from and to the medium.

The optical pickup device can be used in conjunction with with, for example, read-only optical discs such as "CD-ROM" and "DVD-ROM" format discs; writable optical discs such as those of the "CD-R", "DVD-R", and "DVD+R" format, and rewritable optical discs such as those of the "CD-RW", "DVD-RW", "DVD+RW", "DVD-RAM", "HD-DVD", and "Blu-ray" formats.

An optical disc apparatus (not shown) provided with the above-described optical pickup device can be installed in, for example, computers such as various types of personal computers (PC), acoustic equipment such as a CD player, and video equipment such as a DVD player (none of which are illustrated in the drawings) Examples of types of computers which may employ the present invention include notebook PCs, laptop PCs, and desktop PCs.

While a desktop computer is a type of computer that can be used on a desk and can not be easily carried, because a notebook type or a laptop type PC is required to have a light weight and small thickness, a disk apparatus equipped with a slim type drive is required for such portable notebook or laptop PCS. The structure of a notebook or a laptop PC generally differs from that of a desktop type PC. A notebook or laptop PC has, for example, a structure in which the display and main body are integrated, and the display can be folded relative to the PC main body to realize a thin size. A notebook type PC may have an overall size equivalent to the metric A-4 size or less, and are sometimes referred to as "book type" PCs. It is important for a notebook and laptop type PCs that they be compact and can be easily carried.

An optical disc apparatus (not shown) equipped with an above-described optical pickup device can be provided in, for example, an optical disc apparatus for a desktop type PC. An optical disc apparatus (not shown) equipped with an above-described optical pickup device can be installed in, for example, an optical disc apparatus for thin profile computers as notebook and a laptop type PCs, which can be easily carried. The above-described optical pickup device can be installed in an optical disc apparatus for a notebook type PC.

The lens according to the invention is not limited to that shown in FIG. 1, and the optical pickup device according to the present invention is not limited to one as described above. For example, in place of the convex lens 1 shown in FIGS. 1-4, a lens using a concave lens (not shown) can also be employed. Further, in place of the convex lens 1 shown in FIGS. 1-4, a lens using a concave lens (not shown) including an antireflection-processed region can also be used. Products according to the present invention can be modified in various ways without departing from the scope of the invention.

The invention claimed is:

1. A lens comprising:
    a reflective annular zone face being approximately perpendicular to the lens optical axis with tilt of the reflective annular zone face being set to be equivalent to coma aberration of the lens,
    wherein an antireflection-processed region, for preventing reflected light from being irradiated from a flatness degraded portion where flatness formed on the reflective annular zone face is degraded, is formed on a lens discrimination means for determining quality of the lens by using light reflected from the reflective annular zone face.

* * * * *